(12) United States Patent
Wobben

(10) Patent No.: US 7,785,073 B2
(45) Date of Patent: Aug. 31, 2010

(54) METHOD FOR MOUNTING A ROTOR BLADE OF A WIND POWER INSTALLATION WITHOUT USING A CRANE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 35 days.

(21) Appl. No.: 10/543,620

(22) PCT Filed: Nov. 7, 2003

(86) PCT No.: PCT/EP03/12447

§ 371 (c)(1),
(2), (4) Date: Jan. 9, 2006

(87) PCT Pub. No.: WO2004/067954

PCT Pub. Date: Aug. 12, 2004

(65) Prior Publication Data

US 2006/0228220 A1    Oct. 12, 2006

(30) Foreign Application Priority Data

Jan. 29, 2003    (DE) ............................... 103 03 555

(51) Int. Cl.
*F03D 11/00* (2006.01)
(52) U.S. Cl. ................ 416/146 R; 416/248; 416/204 R
(58) Field of Classification Search ........................ None
See application file for complete search history.

(56) References Cited

U.S. PATENT DOCUMENTS 4,236,873 A    12/1980 Sherman et al.

(Continued)

FOREIGN PATENT DOCUMENTS

DE    296 03 278 U1    4/1996

(Continued)

OTHER PUBLICATIONS

Office Action mailed May 13, 2008, relating to Japanese Patent Application No. 2004-567293, 2 pages.

(Continued)

*Primary Examiner*—Richard Edgar
(74) *Attorney, Agent, or Firm*—Seed Intellectual Property Law Group PLLC

(57) ABSTRACT

It has already long been known to use mobile cranes for mounting rotor blades to a wind power installation. Such cranes pick up the rotor blade at the base of the wind power installation and take it to the rotor blade connection of the hub of the wind power installation so that the rotor blade can be connected to the hub. That connection is usually made by screw means, in which case screw bolts are let into the connecting flange of the rotor blade and project into corresponding bores in the rotor blade connection of the hub so that nuts can be screwed on to the screw bolts. The object of the invention is attained by a blade mounting method having the features of claim 1. Advantageous developments are set forth in the appendant claims. A method of mounting or dismantling a rotor blade of a wind power installation without using a crane to a rotor blade connection on a hub of a rotor of the wind power installation, wherein at least one cable is stretched between a part in the hub region of the wind power installation and the bottom region of the wind power installation and the rotor blade is moved along the cable upwardly upon mounting or downwardly upon dismantling.

11 Claims, 1 Drawing Sheet

U.S. PATENT DOCUMENTS

| | | | |
|---|---|---|---|
| 4,266,911 A | 5/1981 | Helm et al. | |
| 4,311,434 A | 1/1982 | Abe | |
| 4,412,784 A | 11/1983 | Wackerle et al. | |
| 2006/0175465 A1 * | 8/2006 | Teichert | 244/33 |

FOREIGN PATENT DOCUMENTS

| | | |
|---|---|---|
| DE | 197 26 408 C1 | 3/1999 |
| DE | 19726408 C1 * | 3/1999 |
| DE | 101 11 523 A1 | 9/2002 |
| DE | 102 24 439 A1 | 12/2003 |
| DE | 10224439 A1 * | 12/2003 |
| EP | 1 101 936 A2 | 5/2001 |
| EP | 1101936 A2 * | 5/2001 |
| EP | 1239150 A2 | 9/2002 |
| JP | 6313028 B2 | 3/1988 |
| JP | 03-051182 U * | 5/1991 |
| JP | 351182 U | 5/1991 |
| WO | 96/10130 A1 | 4/1996 |
| WO | WO 9610130 A1 * | 4/1996 |
| WO | WO 03048569 A2 * | 6/2003 |
| WO | 2004022970 A1 | 3/2004 |
| WO | WO 2004022970 A1 * | 3/2004 |

OTHER PUBLICATIONS

Hau, Erich, *Windkraftanlagen*, Springer-Verlag, 1988.

\* cited by examiner

METHOD FOR MOUNTING A ROTOR BLADE OF A WIND POWER INSTALLATION WITHOUT USING A CRANE

BACKGROUND OF THE INVENTION

1. Field of the Invention

The invention concerns a method for mounting a rotor blade of a wind power installation without using a crane and a wind power installation implementing said method.

2. Description of the Related Art

It has already long been known to use mobile cranes for mounting rotor blades to a wind power installation. Such cranes pick up the rotor blade at the base of the wind power installation and take it to the rotor blade connection of the hub of the wind power installation so that the rotor blade can be connected to the hub. That connection is usually made by screw means, in which case screw bolts are let into the connecting flange of the rotor blade and project into corresponding bores in the rotor blade connection of the hub so that nuts can be screwed on to the screw bolts and in that way the rotor blade is fixed to the hub.

As published state of the art attention is directed in particular to the book by Hau, Erich: Windkraftanlagen, 1996. It is also known, in place of a mobile crane, to use a stationary crane which is mounted on the machine housing of the wind power installation. That stationary crane is provided with a cable winch and a winch drive so that the rotor blade at the base of the wind power installation is drawn upwardly to the rotor blade connection and can then be connected thereto.

A disadvantage of mobile cranes is that they must always be on site when the rotor blades are to be mounted to the hub of the wind power installation with such cranes. As almost all other parts of the machine housing are also fitted with those mobile cranes, the rotor blade must be on the building site at the same time with those parts, in order to be able to make best possible use of the mobile cranes, so that all essential parts of the machine housing of the wind power installation, together with all rotor parts, can be mounted with a single use of the crane. If however it is not possible for the rotor blades to be delivered to the building site at the correct time, then either the crane has to wait for the arrival of the rotor blade or as an alternative thereto the crane has to be brought to the site again so that the blade mounting operation can be effected when the rotor blades are delivered.

A disadvantage of stationary cranes is that usually they can also only be mounted on the machine housing of the wind power installation by means of a mobile crane and in addition, if such stationary cranes remain on the machine housing, they are only extremely rarely used so that the costs involved with such stationary crane installations are scarcely reasonably related to the benefit thereof.

BRIEF SUMMARY OF THE INVENTION

The aim of the invention is to avoid the above-indicated disadvantages and in particular to provide an inexpensive alternative for the blade mounting operation.

That object is attained by a blade mounting method having the features of claim 1. Advantageous developments are set forth in the appendant claims.

With the method according to the invention it is possible to forego the use of a crane for the blade mounting operation. At least the rotor blade is not taken by means of a mobile crane to the rotor blade connection of the hub of the wind power installation. Rather, the invention proposes stretching at least one cable and preferably two cables in parallel relationship with the pylon of the wind power installation between the hub region of the machine housing of the wind power installation and the bottom region at the base of the pylon of the wind power installation. If now those cables receive pass-through winches and those pass-through winches are connected to the hub connection end of the rotor blade, then the pass-through winches can raise the rotor blade on the taut cables to the hub of the wind power installation. When the respective hub is moved with the associated connection into the 6 o'clock position, then the rotor blade with its hub connection can be moved directly to the rotor blade connection on the hub, the screw bolts can be introduced directly into the holes provided for same in the hub and the rotor blade can then be directly connected to the hub. Subsequently to the entire rotor blade mounting procedure the cable can be removed and used again on a further site.

The advantage of the method according to the invention is that on the one hand it is possible to entirely forego the use of a mobile crane for mounting the blades, but on the other hand there is no need for a stationary crane in order to mount (remove) a rotor blade to the hub. In addition the tools which are necessary for blade mounting in accordance with the method of the invention can also be used in relation to other wind power installations, which is usually not possible when stationary crane installations are involved.

In addition the tool which is required for the invention to carry out the method according to the invention is of a very simple nature, with the mounting being sufficiently safe and secure.

If two cables are stretched fast from the hub region of the wind power installation to the bottom region, and each cable carries a pass-through winch, then the drive for the winches can be effected both synchronously and also individually (asynchronously) in order thus in the best possible way to move the rotor blade to the blade connection of the hub in accurate fitting relationship. To provide for mutually superposed positioning of the screw bolts of the rotor blade with the corresponding bores in the rotor blade connection, it is also possible for the rotor blade connection itself to be turned, as in the subsequent pitch mode of operation, so that the correct screw bolts are in the holes intended for same and are fixedly connected to the hub.

If the wind power installation has three rotor blades, it is advantageous if one of the cables is carried by a (rotatable) shaft or a shaft trunnion of the wind power installation so that, upon rotation of the hub, that cable always remains taut and does not have to be set up afresh in order to prepare the blade mounting procedure for a further rotor blade.

Only the cable which is held in the front part of the hub, the so-called spinner, has to be transposed upon rotation of the hub through 120° (in the case of a rotor with three rotor blades) in such a way that, for the blade mounting operation, the cable is disposed parallel to the rotor blade connection of the hub to be fitted with the blade, and is oriented vertically. Such conversion however is relatively simple and can be effected without a very great deal of time and cost.

BRIEF DESCRIPTION OF THE DRAWING

The invention is described by way of example hereinafter by means of an embodiment illustrated in the drawing, wherein.

DETAILED DESCRIPTION OF THE INVENTION

Figure 1:
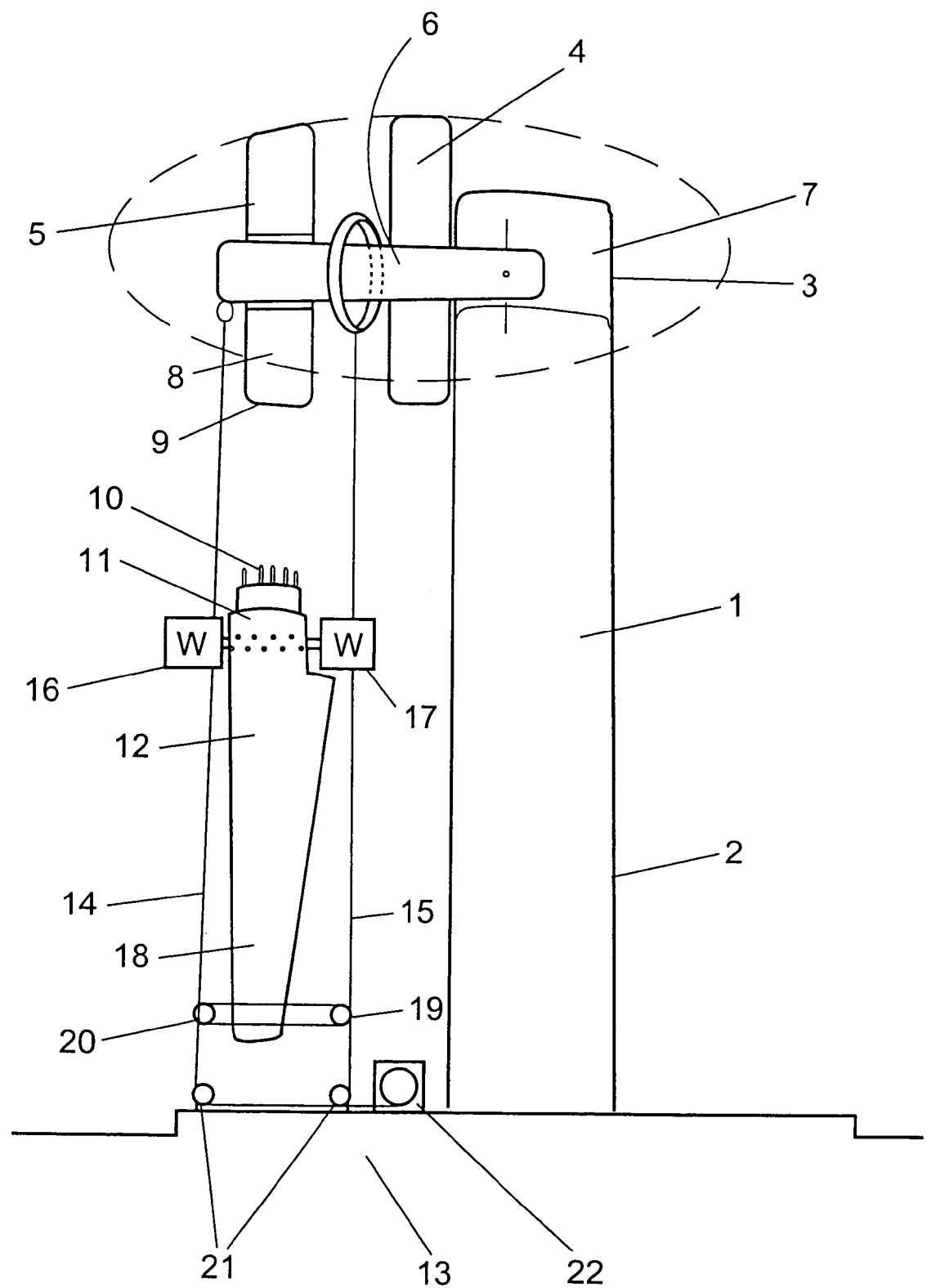
FIG. 1 shows a side view of a wind power installation.

FIG. 1 shows a side view of a wind power installation 1 comprising a pylon 2 and a machine housing 3 which is disposed on the pylon and which accommodates a generator 4 and a rotor 5 with a hub 8, the generator and the rotor being held by a shaft trunnion 6 which is mounted on a machine carrier 7 of the machine housing. The hub 8 itself has a rotatably mounted rotor blade connection 9 having an annular flange with a plurality of bores, through which screw bolts 10 on the connecting flange 11 of the rotor blade 12 can be fitted in the mounting procedure, so that the rotor blade can be screwed to the rotor blade connection of the hub by fitting nuts on the screw bolts. The rotor blade connection is further provided with a usual pitch drive (not shown) in order in that way to rotate the entire rotatable part of the rotor blade to a desired pitch angle.

Two cables 14, 15 are stretched substantially parallel to each other and parallel to the pylon 2 from the hub region 8 of the machine housing 3 of the wind power installation 1 to the bottom region 13 (foundation) of the wind power installation. Each of the cables carries a pass-through winch 16, 17 which in turn are releasably connected to the connection 11 of the rotor blade 12, which is at the hub end.

In the region remote from the hub end, that is to say in the end region 18 of the rotor blade 12 (the rotor blade tip), the cable has a guide device 19 and a receiving device 20 which on the one hand receives that region of the rotor blade and at the same time guides the rotor blade 12 as it is pulled up along the cables so that the rotor blade does not come into contact with the cables, and which on the other hand prevents deflection of the rotor blade out of the desired raising or lowering direction.

Each pass-through winch includes a drive (not shown) which in operation moves the winch upwardly along the cable so that the rotor blade 12 which is connected thereto is pulled upwardly.

The drive for the pass-through winches is controllable, but nonetheless the arrangement may also involve a synchronous drive for the pass-through winches so that they run up or down the cable in parallel relationship with each other and always at the same height.

Independent (asynchronous) operation of the winches has the advantage that in that way the rotor blade connection can be inclined through a given angle if that is necessary in order to insert the screw bolts of the connecting flange of the rotor blade into the corresponding rotor blade connection on the hub.

Fixing of the cables to the ground can be effected by suitable weighted plates (foundation) in which are disposed eyes 21 which receive the cable which in turn is lashed fast to a further winch 22. The fixing of a cable to the machine housing can also be effected in a similar manner, but it is also possible for that cable which is carried by the shaft trunnion to be accommodated by a so-called sling, a textile belt which is slung around the shaft trunnion. Likewise the second cable can be fixed with a sling which is slung around the desired rotor blade connection of the rotor hub. It will be noted however that this rotor blade connection is disposed in the region of the spinner, that is to say the hub cowling which rotates with the rotor, and therefore has to be respectively freshly fitted from one rotor blade to another.

If a conventional steel cable, for example a 14 mm cable, is used as the cable, a rotor blade can already be raised therewith without any problems.

Instead of two cables however it is also possible to provide only one single cable along which the rotor blade is raised and taken to the rotor blade connection of the hub. That is possible in particular if there is a corresponding guide means which holds the rotor blade in the desired reference or target position.

That guide means can be for example a rigid member which is guided on a cable and which ensures that the rotor blade remains in a substantially perpendicular position when being pulled up.

After the blade mounting operation each cable can be easily removed and used at a fresh site.

The method according to the invention is also suitable for dismantling a blade, which is usually effected when the blade, for whatever reasons, has to be removed from the wind power installation and/or then either repaired or replaced by another blade.

The method according to the invention is also suitable for raising or lowering other parts of the wind power installation which are required in the machine housing of the wind power installation, without using a crane.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of mounting or dismantling a rotor blade of a wind power installation to a rotor blade connection on a hub of a rotor of the wind power installation, the method comprising:
    extending at least one cable between a part in a hub region of the wind power installation and a bottom region of the wind power installation
    coupling the rotor blade to a horizontal elongate member extending between a first winch movable along the cable and a second winch;
    positioning the rotor blade in a receiving device;
    moving the rotor blade carried by the elongated member along the cable upwardly upon mounting or downwardly upon dismantling; and
    guiding the rotor blade along the cable using a guide device to prevent contact between the rotor blade in the receiving device and the cable and to prevent substantial deflection of the rotor blade.

2. The method according to claim 1 characterized in that at least two cables are stretched in substantially mutually parallel relationship between the hub region of the wind power installation and the bottom region and the rotor blade is supported between the two cables and there is provided on each cable a respective one of the first winch and the second winch.

3. The method according to claim 2 wherein the first winch and the second winch are individually and synchronously controllable.

4. The method according to claim 1 wherein at least one of the first winch and the second winch is a pass-through winch that moves the rotor blade, the pass-through winch embracing the cable and connected to the rotor blade.

5. The method according to claim 4, wherein the pass-through winch is connected to a connecting flange of the rotor blade.

6. The method of claim 1, further comprising:
vertically moving the first winch, the second winch, and the horizontal elongate member along the cable to vertically move the rotor blade carried by the elongate member.

7. A method comprising:
coupling a rotor blade to a substantially horizontal elongate member, the elongate member connected to a winch;
moving the winch along at least one cable to vertically move the horizontal elongate member and the rotor blade carried by the horizontal elongate member, the at least one cable extending between a hub region of a wind power installation and a bottom region of the wind power installation;
positioning the rotor blade in a receiving device; and
guiding the rotor blade along the at least one cable using a guide device to prevent contact between the rotor blade received by the receiving device and the cable and to prevent substantial deflection of the rotor blade.

8. The method of claim 7, wherein coupling the rotor blade to the substantially horizontal elongate member includes coupling the elongate member proximate to an end of the rotor blade.

9. The method of claim 7, further comprising:
guiding a tip region of the rotor blade using the guide device that is spaced apart from the winch while moving the winch along the at least one cable.

10. The method of claim 7, wherein the at least one cable includes a pair of substantially parallel cables.

11. The method of claim 7, wherein coupling the rotor blade to the horizontal elongate member comprises positioning the rotor blade along the elongate member such that opposing ends of the elongate member extend outwardly past the rotor blade.

* * * * *